United States Patent
Shaffer et al.

(10) Patent No.: US 8,831,023 B2
(45) Date of Patent: Sep. 9, 2014

(54) LOW LATENCY MESH NETWORK (75) Inventors: Shmuel Shaffer, Palo Alto, CA (US); Robert J. Friday, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 972 days.

(21) Appl. No.: 12/511,626

(22) Filed: Jul. 29, 2009

(65) Prior Publication Data
US 2011/0026500 A1 Feb. 3, 2011

(51) Int. Cl.
 H04W 40/22 (2009.01)
 H04W 40/24 (2009.01)
 H04W 84/18 (2009.01)

(52) U.S. Cl.
 CPC ............ *H04W 40/246* (2013.01); *H04W 40/22* (2013.01); *H04W 84/18* (2013.01)
 USPC ............................ 370/406; 370/315; 370/235

(58) Field of Classification Search
 USPC ......... 370/226, 235, 243, 246, 274, 279, 293, 370/310.2, 315, 327–339, 349, 406, 492, 370/501; 455/8–10, 11.1, 12.1, 13.1, 13.2, 455/13.3, 13.4, 14–25, 422.1; 714/18, 714/748–751
 See application file for complete search history.

(56) References Cited

U.S. PATENT DOCUMENTS

| | | | | |
|---|---|---|---|---|
| 5,138,614 A * | 8/1992 | Baumgartner et al. | ....... | 370/261 |
| 6,353,596 B1 * | 3/2002 | Grossglauser et al. | ....... | 370/256 |
| 6,831,898 B1 * | 12/2004 | Edsall et al. | ................... | 370/256 |
| 7,289,428 B2 * | 10/2007 | Chow et al. | .................... | 370/216 |
| 7,321,551 B2 * | 1/2008 | Dombkowski et al. | ........ | 370/216 |
| 7,342,890 B1 * | 3/2008 | Ferguson | ....................... | 370/238 |
| 7,512,063 B2 * | 3/2009 | Vasseur et al. | ................ | 370/217 |
| 7,515,529 B2 * | 4/2009 | Vasseur et al. | ................ | 370/221 |
| 7,586,841 B2 * | 9/2009 | Vasseur | ......................... | 370/218 |
| 7,593,393 B2 * | 9/2009 | Walter et al. | ................... | 370/352 |
| 7,606,902 B2 * | 10/2009 | Rao et al. | ....................... | 709/225 |
| 7,715,403 B2 * | 5/2010 | Qian et al. | ..................... | 370/394 |
| 7,757,074 B2 * | 7/2010 | Sundarrajan et al. | ......... | 713/151 |

(Continued)

FOREIGN PATENT DOCUMENTS

WO   WO 2007/148871 A1   12/2007

OTHER PUBLICATIONS

International Search Report and Written Opinion for International Application No. PCT/US2010/041690 dated Jul. 29, 2009.

(Continued)

*Primary Examiner* — Hoon J Chung
(74) *Attorney, Agent, or Firm* — Tucker Ellis LLP (57) ABSTRACT

In an example embodiment, there is disclosed herein an apparatus comprising a wireless transceiver and packet processing logic coupled to the wireless transceiver. The packet processing logic is responsive to receiving a packet from a first node on a first path addressed to a node on a second path via the wireless transceiver to forward the packet on the second path towards the node on the second path via the wireless transceiver. The packet processing logic is further configured to send a reply to the packet to the first node on the first path via the wireless transceiver to a second node on the first path that is within range of the wireless receiver and on the second path to the first node on the first path responsive to determining the wireless transceiver cannot send a message directly the first upstream node.

17 Claims, 3 Drawing Sheets

(56) References Cited

U.S. PATENT DOCUMENTS

| | | | |
|---|---|---|---|
| 7,940,660 B2* | 5/2011 | Zhu et al. | 370/230.1 |
| 8,059,011 B2* | 11/2011 | Van Wyk et al. | 340/870.11 |
| 8,072,879 B2* | 12/2011 | Vasseur et al. | 370/225 |
| 2004/0102219 A1* | 5/2004 | Bunton et al. | 455/560 |
| 2006/0291440 A1* | 12/2006 | Hausl et al. | 370/340 |
| 2009/0028058 A1 | 1/2009 | Freeburg | |
| 2009/0075662 A1* | 3/2009 | Marque-Pucheu | 455/445 |
| 2009/0252065 A1* | 10/2009 | Zhang et al. | 370/256 |
| 2010/0027419 A1* | 2/2010 | Padhye et al. | 370/235 |
| 2010/0097976 A1* | 4/2010 | Agrawal et al. | 370/315 |
| 2010/0110967 A1* | 5/2010 | Sartori et al. | 370/315 |
| 2010/0157888 A1* | 6/2010 | Aggarwal et al. | 370/328 |
| 2010/0275087 A1* | 10/2010 | Doppler et al. | 714/749 |
| 2011/0026500 A1* | 2/2011 | Shaffer et al. | 370/338 |

OTHER PUBLICATIONS

PCT/US10/41690 International Preliminary Report on Patentability and Written Opinion of the International Search Authority Jan. 31, 2012.

* cited by examiner

FIG. 5

LOW LATENCY MESH NETWORK

TECHNICAL FIELD

The present disclosure relates generally to network communications.

BACKGROUND

Mesh networks are increasing in popularity due to their flexibility. A mesh network does not require network cabling making them easier to set up and deploy. For example, a mesh network can be employed to implement a smart grid, which for this example is a wide area control system with numerous control loops. One of these control loops employs smart meters at consuming facilities (residential, commercial and industrial). The metering information is communicated upstream to a datacenter where it is stored and analyzed. The system continuously monitors the available power and compares it to the consumers' demand. To minimize the probability of blackouts, the system always maintains spinning reserves, which can be brought online in a short period of time to meet demand. When the spinning reserves fall below a certain threshold, the smart grid issues demand response (DR) requests to consumers requesting that they reduce consumption by shedding non-urgent load. The system monitors consumer compliance by comparing the metering readout prior to issuing the DR request to the one after the DR request was issued. The control loop in this scenario includes the smart metering, the communication path from the smart meters to the datacenter, the metering data analytics software, and then the communication path back to the home appliance or home energy controller which controls the energy consumption at the home or facility. As with any other control system, the shorter the delay in this loop, the better the performance of the overall system. Wireless mesh networks can be extensively used as part of the smart grid for last mile communication to the meter. In this implementation, each smart meter operates as a hub in the mesh network which facilitates the transfer of metering data from its neighbors, along with its own metering data, upstream towards a datacenter. Similarly each smart meter may operate as a hub which can facilitate the transfer of DR from the utility datacenter to other homes in its neighborhood. Mesh networks have the advantage of being able to communicate using low power transmitters, which helps minimize the power requirements of the transmitters in each meter.

BRIEF DESCRIPTION OF THE DRAWINGS

The accompanying drawings incorporated herein and forming a part of the specification illustrate the examples embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a wireless transceiver and packet processing logic coupled to the wireless transceiver. The packet processing logic is responsive to receiving a packet from a first upstream node addressed to a downstream node via the wireless transceiver to forward the packet on a downlink path towards the downstream node via the wireless transceiver. The packet processing logic is further configured to send a reply to the packet to the first upstream node via the wireless transceiver to a second upstream node that is within range of the wireless receiver and on an uplink path to the first upstream node responsive to determining the wireless transceiver is unable to transmit a signal that will reach the first upstream node.

In accordance with an example embodiment, there is disclosed herein a method, comprising establishing a wireless connection with a first upstream node, where downlink packets are received directly from the first upstream node and uplink packets to the first upstream node are routed through a second upstream node. A packet that is received directly from the first upstream node addressed to a downlink node via the wireless connection is forwarded towards the downlink node via the wireless connection.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Figure 1:
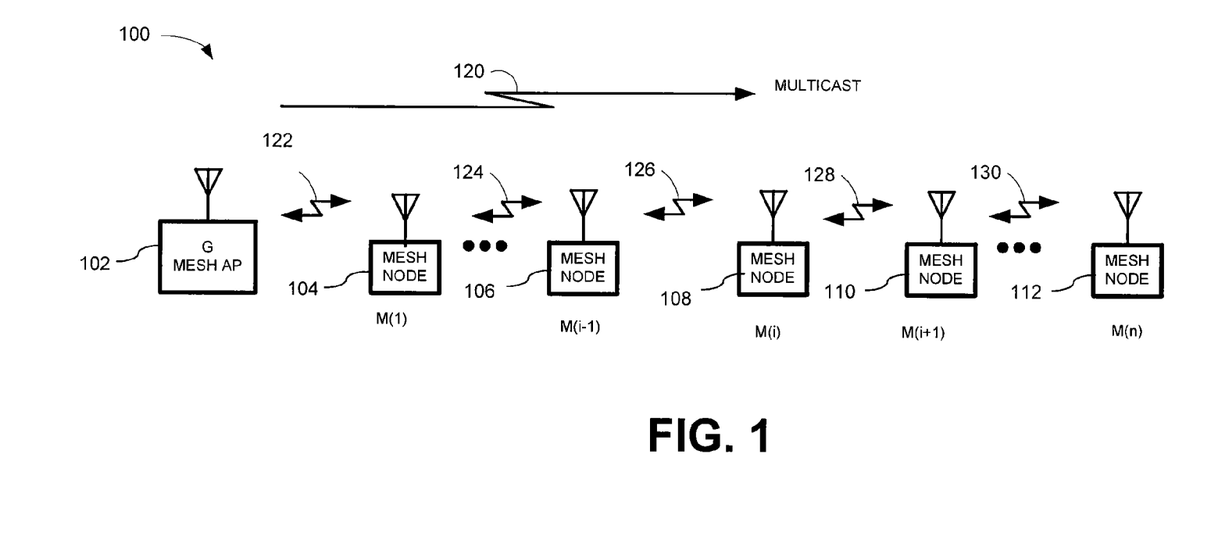
FIG. 1 illustrates a wireless mesh network configured in accordance with an example embodiment.

In an example embodiment illustrated in FIG. 1, a smart grid mesh network 100 uses smart meters 104, 106, 108, 110, 112 as low power nodes. To this end, each smart meter 104, 106, 108, 110, 112 can be used to facilitate transmission of information to or from neighboring smart meters to or from towards the datacenter. For example, as illustrated in FIG. 1, Gateway "G" 102 can communicate bi-directionally with Meter (Mesh Node) M(1) 104 as illustrated by 122. Meter M(1) 104 can communicate bi-directionally with Meter M(i−1) 106 either directly or in particular embodiments point to point via additional meters (for example M(1) 104 to M(2) M(i−2) to M(i−1) 106, where meters M(2) and M(i−2) are not shown) between Meter M(1) 104 and M(i−1) 106 as illustrated by 124. Meter M(i−1) 106 can communicate bi-directionally with meter M(i) 108 as illustrated by 126. Meter M(i) 108 can communicate bi-directionally with meter M(i+1) 110 as illustrated by 128. Meter M(i+1) 112 can communicate bi-directionally with meter M(n) 112 either directly or point to point via additional meters (for example M(i+1) 110 to M(i+2) M(n−1) to M(n) 112, meters M(i+2) M(n−1) are not shown) between Meter M(i+1) 110 and M(n) 112 as illustrated by 130. In this example, gateway 102 operates at a higher power than mesh nodes 104, 106, 108, 110, 112 and therefore a signal (illustrated by 120) transmitted by gateway 102 can be received by mesh nodes more than one hop away, however, those mesh nodes more than one hope away, 106, 108 110, 112 lack sufficient power to communicate directly back to gateway 102. For example, meter M(1) 104 is one hop away, and meters M(i−1) 106 and M(i) 108 are more than one hop away from gateway 102. Thus, for this example only meter M(1) 104 has sufficient power to communicate directly back (represented by 122) to gateway 102.

The metering information flows uplink via a gateway or a concentrator (or Mesh Access Point "MAP") 102. As part of the automatic mesh network configuration, each node (smart meter) 104, 106, 108, 110, 112 finds its distance (such as a number of hops) from the concentrator (gateway 102) and publishes this distance to its neighbors. This information is used by its neighbors to select the shortest (lowest delay) path uplink. Most mesh algorithms also use the shortest uplink path for their downlink communication. As one skilled in the art can readily appreciate, it is not unusual for a "last mile" mesh topology to have a few thousand smart meters connected to a wide area network via a single concentrator. Additional concentrators (not shown) may be used to increase the availability of the network.

For this example, assume a "last mile" mesh network which is connected to a wide area network via gateway "G" 102. Also assume that meter M(n) 112 can reach the gateway G over n hops through meters M(n−1), M(n−2), ... M(2), and M(1) 104. Due to the low power of its transmitter, M(n) 122 cannot communicate directly to the gateway. As previously described, the path described above is used for both the uplink and downlink communication between the gateway G 102 and the meter M(n) 122.

An aspect of an example embodiment is based on the observation that while the power of the meters is kept at a minimum, the concentrator may use higher power. Thus, the downlink path may skip a few meters, e.g., M(1) 104 through M(i−1) 106 and go through M(i) 108] and communicate with meter M(n) 112 via meters M(i) 108, M(i+1) 110, M(i+2), ... . M(n−2), M(n−1) where kn. Existing Internet Protocol "IP" routing protocols support asymmetric networks wherein packets take one route from node A to node B and a different path from node B to node A. These algorithms assume that each segment can establish layer 2 connectivity between any two adjacent nodes along the path. This assumption clearly does not hold in the example topology described herein. While meter M(i) 108 can receive packets from the Gateway G 102, its transmitter does not have sufficient power to establish layer 2 connectivity back to G 102 to directly acknowledge the receipt of packets back to gateway G 102. In accordance with an example embodiment, meter M(i) 108 in communication with meters M(i−1) 106 and M(i+1) 110 recognizes the fact that it is the farthest node from gateway 102 (in the downlink path towards the meter M(n) 112) which can receive a signal 120 from gateway 102. As a result, in an example embodiment, meter M(i) 108 establishes a peer to peer layer 3 acknowledgement mechanism with gateway G 102. The communication downstream from the gateway G 102 towards meter M(i) 108 uses multicast mode without a layer 2 acknowledgement signal and replaces it with layer 3 acknowledgement between meter M (i) 108 and gateway G 102.

In an example embodiment, in order to simplify the overall formation of the downlink mesh, the system may utilize the uplink routing table of nodes M(i+1) 110 through M(n) 112 to establish the downlink path from meter M(i+1) 110 to M(n) 112.

In accordance with an example embodiment, each meter (node in the mesh) 104, 106, 108, 110, 112 is equipped with sufficient memory to store a log of downlink messages which have been recently sent, e.g., in the last one second. As a new downlink packet arrives at a meter, the meter compares the packet against the log of packets it has recently sent. If the packet proves to be a duplicate, the message is filtered and not forwarded. This mechanism ensures that only non-duplicate messages are sent towards meter M(n) 112. This mechanism prevents duplicate messages from clogging the network and slowing it down. The following example provides a more detailed illustration of the operations of the system in accordance with our invention:

Network Formation:

Step 1: a Mesh network consisting of low power nodes (meters) 104, 106, 108, 110, 112 and high power node (G) 102 is established using a suitable protocol.

Step 2: Once the mesh relationship is established, nodes which are not direct children of G 102 (for example meters 106, 108, 110, 112) start listening to radio signals coming directly from G 102. For each communication path to edge nodes (such as meter M(n) 112) peer nodes identify a node, M(i) 108, which is the furthest node from G 102 which can still receive signals from the G 102.

Step 3: Node M(i) 108 creates a client with a buffer for managing the communication towards edge node M(n) 112. The operations of this client and buffer will be explained herein below. Moreover, in particular embodiments, all nodes that are not direct children between G 102 and M(i) 108 such as M(i−1) 106 may also create the client and buffer described herein.

Normal Operation—No Lost Packets:

Packet P(k) from gateway 102 to edge node M(n) 112 arrives at node M(i) 108 via the direct path (represented by signal 120). In an example embodiment, signal 120 may be a multicast signal which may be received by any or all nodes between gateway 102 and node M(i) 108. The path signal 120 travels may also be referred to herein as the multicast path. Packet P(k) is immediately forwarded via nodes M(i+1), 110 M(i+2), etc. towards the edge node M(n) 112. In addition to forwarding the packet P(k), node M(i) 108 saves a copy (or data representative) of the packet in its buffer. In accordance with yet another example embodiment only the packet identifier is saved in the internal tables of node M(i). After a delay, the maximum of which is proportional to the number of hops from G 102 to node M(n) 112 [n* (delay of a node)], a duplicate of the packet P(k) arrives again at node M(i) 108 via the multiple hop path through one or more of nodes M(1) 104, M(2), ... M(i−1) 106. The client on node M(i) 108 examines the sequence number of the arriving packet and identifies it to be identical to the packet P(k) it had previously forwarded towards meter M(n) 112. As the client identifies a match, the duplicate packet P(k) is discarded (not propagated to the edge node). In addition the packet P(k) is removed from the buffer. In an example embodiment may be configured to receive the same packets via signal 120 from gateway 102. In another example embodiment, gateway 102 may send multiple signals, one to node M(1) 104 and one to node M(i) 108. In still yet another example embodiment, gateway 102 may suitably comprise a plurality of gateways (not shown), where one gateway would send a packet to node M(1) 104 and another gateway would send a packet to node M(i) 108. Optionally, additional gateways may send signals to nodes between M1) 104 and M(i) 108 such as node M(i−1) 106.

Operation with a Loss of Multicast Packet:

In this example we assume that packet P(k) was lost in the transmission via the multicast path (represented by signal 120). We also assume that packets P(k+1), P(k+2), etc arrived successfully at node M(i) 108 via path 120. As the client on node M(i) 108 receives packet P(k+1) it stores it in the buffer and takes a note of the fact that Packet P(k) has been lost. As a result, in an example embodiment packet P(k+1) is not forwarded towards the edge (it is stored in the buffer). Similar packet handling takes place for packets P(k+2), etc., until packet P (k) arrives at node M(i) via the slower multi-hop path (represented by 122, 124, 126). As packet P(k) arrives at node M(i) 108 it is identified as the packet which was lost in transmission via the multicast path 120. The client of node M(i) 108 immediately forwards this packet P(k) towards the edge and proceeds to send all of the other packets which were stored in its buffer [such as P(k+1), P(k+2), etc.] towards the edge node (for example M(n) 122). Once all of the sequential messages are sent from the buffer towards the edge node, the system reverts to the normal operation described above.

In particular embodiments, all nodes farther than one hope away from gateway 102 (for example 106 and any nodes between nodes 104 and 106) on the multi-hop path that receive multicast signal 120 from gateway 102 store and forward multicast packets received from gateway 102. For example, node M(i−1) 106 receives P(k) for M(n) 112 via multicast signal 120 and is responsive to stores the packet. Node M(i−1) 106 also forwards the packet to node M(i) 108. If node M(i) 108 received P(k) over path 120, it discards the copy of P(k) received from node M(i−1) 106. If, however, M(i) 108 did not receive P(k) over path 120, P(k) is forwarded on the downlink path (e.g. via 128), along with any stored packets sent after P(k) such as P(k+1), P(k+2), etc. towards M(n) 112. Moreover, any node between M(1) 104 and M(i−1) 106 can also be configured to store and forward signals received on the multicast path. Thus, M(i) 108 can receive lost multicast packets faster than waiting for a packet propagating from M(1) 104 one hop at a time.

Operation with Packet Loss Over the Multi-Hop Path:

In accordance with an example embodiment the buffer described above is implemented as a circular buffer with a size greater than the cumulative size of messages to be received during a period of time equal to the multi-hop delay between gateway G 102 and node M(i) 108 (e.g., 5*(one hop delay)). If a message does not arrive through the multi-hop path (represented by 122, 124, 126), this does not affect the operations of the system as the same message is assumed to have arrived via the multicast path (represented by 120). Given the fact that the M(i) node 108 utilizes a circular buffer, old messages are overwritten and the fact that the lost packet does not erase the corresponding entry in the buffer does not affect the operations of the system. The established parallel paths for packet P(k) not only reduces the overall delay but also provides a more resilient network which can withstand the loss of an IP packet without affecting the overall performance of the system.

Operations of the System when a Packet is Lost Both on the Multi-Hop and Multicast Paths:

If a packet is not received on either the multi-hop path or the multicast path, the system can default to end-to-end recovery at the application level similar to the operation of the system which uses only a single multi-hop path.

Multicast Path Determination:

In an example embodiment, if the system detects that the percentage of lost multicast packets at M(i) 108 is greater than a predetermined threshold, this information is communicated to adjacent nodes and a new multicast node can be selected. For example, the system can fall back to a shorter multicast path by replacing node M(i) 108 with node M(i−1) 106.

In another example embodiment, if a node farther away than M(i) 108 is receiving multicast packets, e.g. node M(i+1) 110, that node can inform node M(i) 108 that it is receiving multicast packets from gateway 102. As a result, node M(i) 108 yields the role of receiving packets from gateway 102 to node M(i+1) 110 and becomes part of the normal multi-hop network. For example, if an acknowledgement is to be sent to gateway 102, it would be sent along the multi-hop path by M(i+1) 110.

It should be noted that the foregoing description described the path from M(i) 108 to gateway 102 as the uplink path and from M(i) 108 to M(n) 112 as the downlink path. This notation was merely chosen for ease of illustration as those skilled in the art should readily appreciate the principles described herein work equally well if the paths are reversed, e.g. the path from M(i) 108 to gateway 102 is the downlink path and from M(i) 108 to M(n) 112 is the uplink path. It should also be noted that although FIG. 1 is described in the context of a smart grid network, the principles described herein are applicable to any mesh network.

Figure 2:
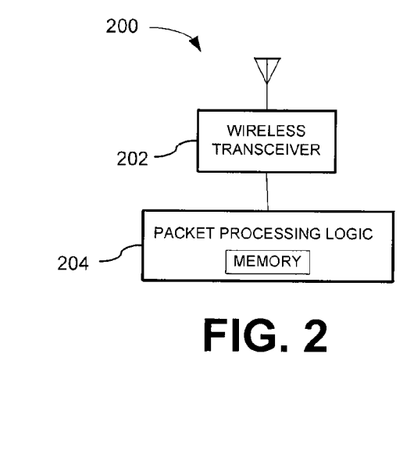
FIG. 2 illustrates an example of a wireless node configured in accordance with an example embodiment.

FIG. 2 illustrates an example of a wireless node 200 configured in accordance with an example embodiment. Wireless node 200 is suitable to implement a mesh network in accordance with an example embodiment herein. For example, wireless node 200 is suitable for implementing any of meters M(1) 104, M(i−1) 106, M(i) 108, M(i+1) 110, M(n) 112 and/or any of other meters described herein in FIG. 1.

Wireless node 200 comprises a wireless transceiver 202 and packet processing logic 204 coupled to wireless transceiver 202. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In an example embodiment, packet processing logic 204 is responsive to receiving a packet from a first upstream node addressed to a downstream node via wireless transceiver 202 to forward the packet on a downlink path towards the downstream node via the wireless transceiver. Packet processing logic is further configured send a reply to the packet to the first upstream node via the wireless transceiver to a second upstream node that is within range of the wireless receiver and on an uplink path to the first upstream node responsive to determining the wireless transceiver is unable to transmit a signal that will reach the first upstream node.

In an example embodiment, packet processing logic 204 is configured to store a copy of the packet. For example the packet may be stored in a memory associated with packet processing logic 204 (an internal memory is illustrated but those skilled in the art should readily appreciate that an external memory may also be employed in lieu of, or in addition to, the internal memory).

In an example embodiment, packet processing logic 204 is configured to receive a copy of the packet from the second upstream node via wireless transceiver 204. Packet processing logic 204 is further configured to determine whether data representative of the packet is already stored (for example was the packet already received directly from the first node) and that a copy of the same packet has already been forwarded towards the next downlink node. As used herein "forwarded" refers to a queuing a packet for transmission (or a copy of the packet) regardless whether if it has been transmitted, is being transmitted, or is just queued for future transmission. Packet processing logic 204 is configured to discard the packet responsive to determining a copy of the packet was already received and that a copy of the same packet has already been forwarded towards the next downlink node. In particular embodiments, the packets received from the first and second nodes suitably comprise a sequence number. Packet processing logic 204 compares sequence numbers of received packets with sequence number of packets that were previously received to determine whether a copy of the packet received from the second node was already received (for example directly from the first node) and that a copy of the same packet has already been forwarded towards the next downlink node. In an example embodiment, packet processing logic 204 deletes the stored packet after a predetermined time period. For example as described herein supra, the predetermined time period may be set to how long it would take a packet to travel one hop at a time without skipping any hops. In an example embodiment, the memory for storing the packets may be a circular storage device. As new packets arrive, they overwrite the oldest packets in the memory.

In an example embodiment, wireless transceiver 202 receives a second packet from the second node addressed to the downstream node. Packet processing logic 204 determines whether a copy of the second packet addressed to the downstream node has been received from the first node (via the direct path 120 as illustrated in FIG. 1). If the packet was not received from the first node, packet processing logic 204 forwards the packet on a downlink path towards the downstream node via wireless transceiver 202.

In an example embodiment, wireless transceiver 202 receives a second packet addressed to the downstream node. Packet processing logic 204 determines whether a packet is missing in the sequence between the first packet and second packet. If packet processing logic 204 determines a packet (one or more packets) is missing between the first and second packets, the second packet is stored. It should be noted that the second packet may be received either from the first node or from the second node. In an example embodiment, wireless transceiver 202 will eventually receive the missing packet from the second node. Packet processing logic 204 is responsive to wireless transceiver 202 receiving the missing packet to forward the missing packet and the second packet on a downlink path towards the downstream node via the wireless transceiver. In particular embodiments, packet processing logic 204 forwards the missing packet and the second packet in sequence according to their sequence numbers.

In an example embodiment, packet processing logic 204 is configured to determine how many hops away wireless transceiver 202 is from the first node. Packet processing logic 202 is further configured to exchange data representative of a number of hops away the wireless transceiver is from the first node, and data representative of a number of hops neighboring wireless nodes receiving a signal from the first node are from the first node. If packet processing logic 204 determines that it is associated with the node that is the farthest from the first node, packet processing logic 204 may establish a connection (for example a tunnel or a layer 3 connection) with the first node. Packet processing logic 204 may determine it is the farthest node from the first node based on the number of hops it is away from the first uplink node and the number of hops neighboring nodes that can directly receive a signal from the first uplink node are from the first uplink node. In particular embodiments, packet processing logic 204 is configured to terminate the layer 3 connection with the first node responsive to determining another node receiving a signal from the first node is farther away from the first node based on the number of hops from the first node. As used herein, a layer 3 connection comports to layer 3 of the Open Systems Interconnection (OSI). For example, layer 1 is the physical layer, layer 2 is the data link layer which manages the interaction of devices with a shared medium (the Media Access Control (MAC) layer is a sub-layer of layer 2), and layer 3 is the network layer (the best known example of a layer 3 protocol is the Internet Protocol "IP").

In accordance with an example embodiment, if packet processing logic 204 determines that the error rate of packets being received from the first node at wireless transceiver 202 exceeds a predetermined threshold (for example 10%) that it will no longer consider itself the farthest node that can communicate with the first uplink node. In this embodiment, if a layer 3 connection or tunnel was established, it will be terminated. This would cause a node closer to uplink node to elect itself as the new farthest node from the first uplink node that is receiving a signal from the first uplink node. For example, if node M(i) in FIG. 1 was the farthest node from gateway 102 and the error rate exceeded a predetermined threshold, then M(i) would inform its neighbors that it is no longer receiving a signal from gateway 102, in which case the next closes node, in this example meter M(i−1) would become the farthest node receiving a signal from the first uplink node.

Figure 3:
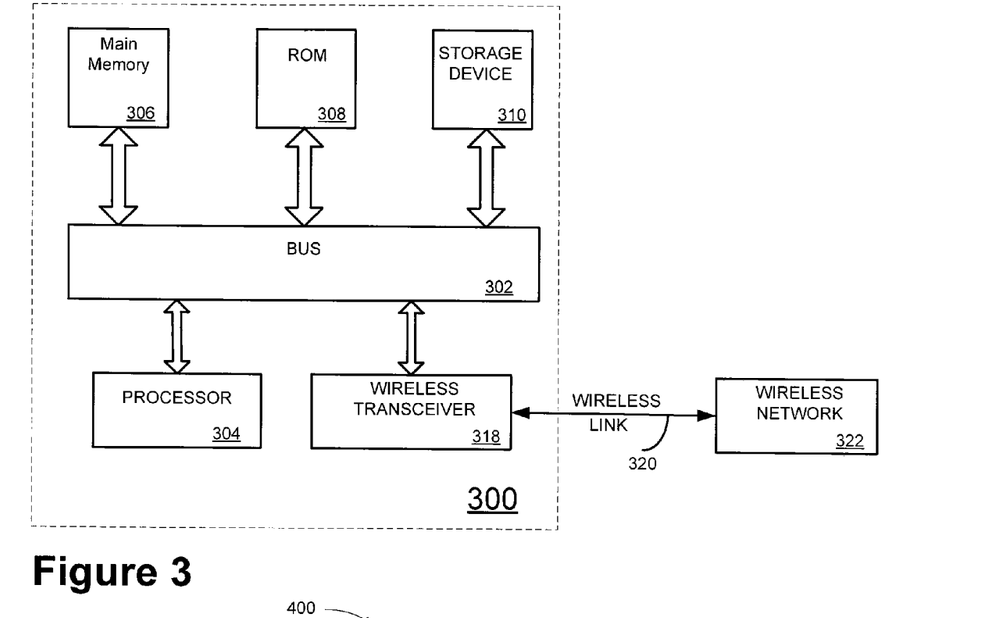
FIG. 3 illustrates an example of a computer system upon which an example embodiment may be implemented.

FIG. 3 illustrates an example of a computer system 300 upon which an example embodiment may be implemented. For example, computer system 300 can be employed for implementing packet processing logic 204 in FIG. 2 or any other logic for implementing the functionality described herein for meters 104, 106, 108, 110, 112.

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for implementing a wireless node for use in a low latency mesh network. According to an example embodiment, implementing a wireless node for use in a low latency mesh network is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, and volatile media. Non-volatile media include for example optical or magnetic disks, such as storage device 310. Volatile media include dynamic memory such as main memory 306. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 300 also includes a wireless transceiver 318 coupled to bus 302. Wireless transceiver 318 provides a two-way data communication coupling computer system 300 to a network link 320 that is connected to a local wireless network 322. Wireless link 320 may allow computer system to wirelessly communicate to other devices, such as neighboring mesh nodes. For example, for implementing a smart grid system, processor 304 can receive data from a meter (not shown in the figure) via wireless transceiver 318 attached to bus 302 such as data representative of consumption from the downlink meter. Processor 304 may store the data in either main memory 306 or storage device 310. Processor 304 may obtain consumption data for a meter associated with computer system 300. Processor 304 forwards the consumption data for the meter associated with computer system 300 and data from the downlink node to an uplink node via wireless transceiver 318. Moreover, processor 304 may receive data from a first node (e.g. gateway 102 in FIG. 1) and a second node on a multi-hop path to the first uplink node via wireless transceiver 318.

Figure 4:
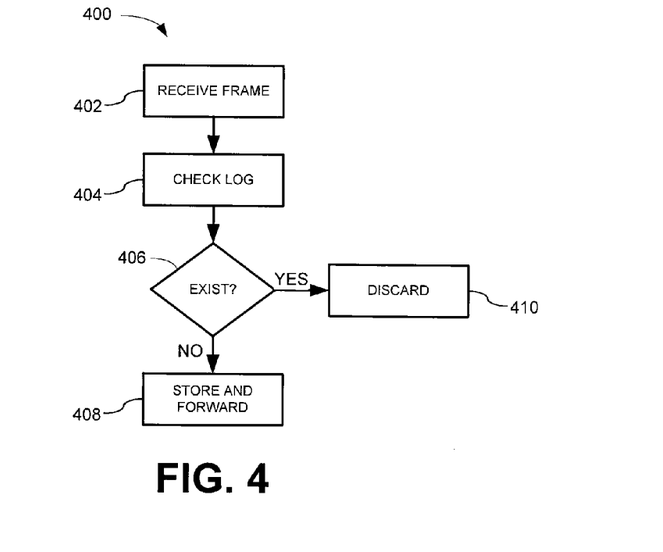
FIG. 4 illustrates an example of a methodology for forwarding downstream mesh packets in accordance with an example embodiment.
Figure 5:
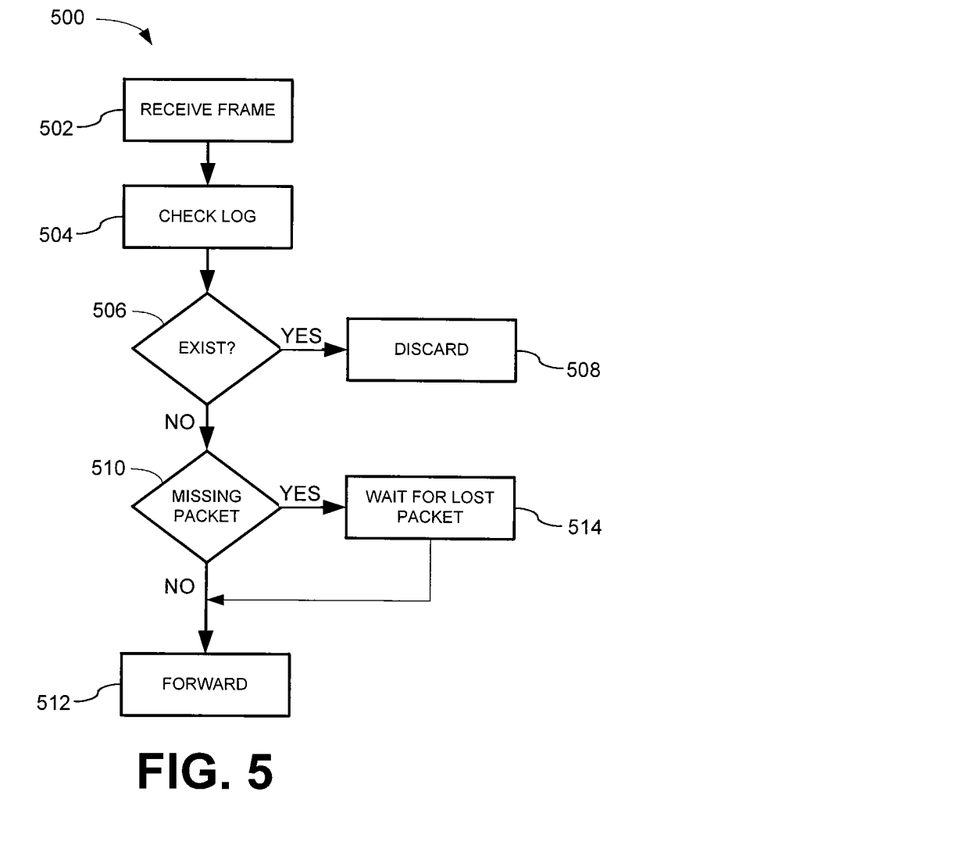
FIG. 5 illustrates an example of a methodology for forwarding downstream mesh packet, which determines if a packet in a sequence of packets is missing.

In view of the foregoing structural and functional features described above, a methodology in accordance with an example embodiment will be better appreciated with reference to FIGS. 4 and 5. While, for purposes of simplicity of explanation, the methodologies of FIGS. 4 and 5 are shown and described as executing serially, it is to be understood and appreciated that the example embodiments are not limited by their illustrated order, as some aspects could occur in different orders and/or concurrently with other aspects from that shown and described herein. Moreover, not all illustrated features may be required to implement a methodology in accordance with an aspect the example embodiment. The methodologies described herein are suitably adapted to be implemented in hardware, software, or a combination thereof.

FIG. 4 illustrates an example of a methodology 400 for forwarding downlink (downstream) mesh packets in accordance with an example embodiment. In an example embodiment, a wireless connection is established with a first uplink node, where downlink packets are received directly from the first uplink node and uplink packets to the first uplink node are routed through a second uplink node. For example, the second uplink node may be one hop closer to the device implementing method 400 than the first uplink node. For example, referring to FIG. 1, for meter M(i) 108, gateway 102 could be the first uplink node and meter M(i−1) 106 could be the second uplink node, where meter M(n) is a downlink node.

At 402, a packet is received from an uplink node via the wireless connection. The packet is addressed to a downlink node. In particular embodiments, the packet may include a sequence number. The packet may be received directly from the first uplink node, or may have been received from the second uplink node (although the packet may have originated from the first uplink node, the packet may have not been directly received from the first node and thus traveled via a multi-hop path to the second uplink node).

At 404, the header information including the sequence number of the received packet is compared against the previously received packet information stored in the buffer. In an example embodiment, the log contains packets received directly from the first uplink node since packets traveling a multi-hop path through the second uplink node would ordinarily take longer to arrive. The previously received packets may include sequence numbers, source addresses and/or destination addresses to aid in matching packets.

At 406, it is determined if a match was found at 404. If at 406 it is determined a match was found (YES), the packet is discarded. In particular embodiments, the log entry for the packet may also be deleted since it is unlikely more than one copy of the packet would travel via the multi-hop path.

If, however, at 406 it is determined that no match was found (NO), the packet is forwarded on a path to its destination. In addition, a copy of the packet, or data representative of the packet such as the header, may be stored to aid in filtering out subsequently received, duplicate packets.

For example, if at 408, a fist packet, or data representative of the packet such as the header, is stored and at 402 a second packet is received that matches the packet stored at 408. The log is checked for a packet matching the second packet at 404. At 406, it will be determined that a match was found (YES) in which case the second frame will be discarded at 410.

FIG. 5 illustrates an example of a methodology 500 for forwarding downstream mesh packet, which determines if a packet in a sequence of packets is missing. If no packets in a sequence are missing, the packet is immediately forwarded; however, if a packet is missing, the packet is stored until a copy of the missing packet arrives. In an example embodiment, sequence numbers are employed to determine whether a packet in a sequence is missing.

At 502, a packet is received from an uplink node via the wireless connection. The packet is addressed to a downlink node. In particular embodiments, the packet may include a sequence number. The packet may be received directly from the first uplink node, or may have been received from the second uplink node (although the packet may have originated from the first uplink node, it may have traveled via a multi-hop path to the second uplink node).

At 504, a log of previously received packets is checked. In an example embodiment, the log contains packets received directly from the first uplink node since packets traveling a multi-hop path through the second uplink node would ordinarily take longer to arrive. The previously received packets may include sequence numbers, source addresses and/or destination addresses to aid in matching packets. In an example embodiment, this step may be skipped for packets received directly from the first uplink node At 506, it is determined if a match was found at 504. If at 506 it is determined that a match was found (YES), the packet is discarded at 508. In particular embodiments, the log entry for the packet may also be deleted since it is unlikely more than one copy of the packet would travel via the multi-hop path.

If, however, at 506 it is determined that no match was found (NO), at 510 it is determined whether a packet is missing in the sequence since the last packet was received. For example, if the current packet received is P(k) and the last packet received was P(k−2), then packet P(k−1) is missing (those skilled in the art should readily appreciate that more than one packet may be missing, this example is using one packet merely for ease of illustration). If at 510 there are no packets missing in the sequence (NO), at 512 the packet is forwarded.

If at 510, it is determined that a packet (e.g. P(k−1) from the preceding example) is missing (YES), at 514 the packet is stored until the lost packet arrives, e.g., via the alternate multi-hop path. Because method 500 may be implemented by a mesh node that may receive packets from a first node directly, or through a multi-hop path (see e.g. M(i) 108 in FIG. 1), it is possible that a packet sent by the first node may not have been received due to interference, etc. directly from the first node. Since the packet is also propagating through a multi-hop path as well, another copy of the packet should eventually arrive through the multi-hop path. Thus, at 502, a copy of the missing packet (e.g. P(k−1) would arrive after the subsequent packet (e.g. P(k)) is stored at 514. Since the missing packet hasn't been received yet, at 504 there will be no log entry for packet P(k−1]. If missing packet is the only remaining missing packet, at 512 the missing packet (e.g. P(k−1) and the subsequent packet (e.g. P(k), which arrived earlier) are forwarded on a downlink path at 512. If at 510 it is determined that there are still other missing packets (YES), at 514 P(k−1) is queued until all of the missing packets arrive.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a wireless transceiver;
packet processing logic coupled with the wireless transceiver;
the packet processing logic determines how many hops the apparatus is from a first node;
the packet processing logic exchanges data with neighboring nodes that can also receive a signal from the first node, the neighboring nodes providing data representative of a number of hops away from the first node;
the packet processing logic determines, based on number of hops away from the first node, whether the apparatus is the farthest node from the first node compared with the neighboring nodes that can receive a signal from the first node;
wherein the packet processing logic is responsive to receiving via the wireless transceiver a packet directly from the first node on a first path addressed to a node on a second path and determining that the apparatus is the farthest node from the first node, to forward via the wireless transceiver the packet on the second path towards the node on the second path; and
wherein the packet processing logic selectively sends a reply to the packet received from the first node via the wireless transceiver to at least one node that belongs to a network that is interstitial to the first node and the apparatus; and
wherein the first node is greater than one hop away from the apparatus.

2. The apparatus of claim 1, wherein the packet processing logic is configured to store data representative of the packet.

3. The apparatus of claim 2, wherein the packet processing logic is configured to receive a copy of the packet from the second node on the first path via the wireless transceiver;
wherein the packet processing logic is further configured to determine whether data representative of the packet is already stored; and wherein the packet processing logic is configured to discard the packet responsive to determining data representative of the packet is already stored.

4. The apparatus of claim 3, wherein the packets received from the first and second nodes on the first path further comprise data representative of a sequence number; and
wherein the packet processing logic determines whether the packet received from the second node is a copy of the packet received directly from the first node by comparing data representative of the sequence number of the packet received from the second node with data representative of the sequence number of the packet received directly from the first node.

5. The apparatus of claim 4, wherein the packet processing logic deletes the data representative of the packet after a predetermined time period.

6. The apparatus of claim 4, wherein the wireless transceiver receives a second packet from the second node on the first path addressed to the node on the second path;
wherein the packet processing logic is configured to determine whether the second packet is a copy of the first packet; and
wherein the packet processing logic forwards the second packet on the second path towards the node on the second path via the wireless transceiver responsive to determining that the second packet is not a copy of the first packet.

7. The apparatus of claim 4, wherein the wireless transceiver receives a second packet addressed to the node on the second path;
wherein the packet processing logic determines whether a packet is missing in the sequence between the first packet and the second packet; and
wherein the packet processing logic stores the second packet responsive to determining a packet is missing in the sequence between the first packet and second packet.

8. The apparatus of claim 7, wherein the second packet is received from the first node.

9. The apparatus of claim 7, wherein the second packet is received from the second node.

10. The apparatus of claim 7, wherein the wireless transceiver receives the missing packet from the second node; and
wherein the packet processing logic is responsive to the wireless transceiver receiving the missing packet to forward the missing packet and the second packet on a downlink path towards the node via the wireless transceiver.

11. The apparatus of claim 10, wherein the packet processing logic forwards the missing packet and the second packet in sequence according to their sequence numbers.

12. The apparatus of claim 1, wherein the packet processing logic is configured to terminate the association with the first node responsive to determining another node receiving a signal from the first node is farther away from the first node based on the number of hops from the first node.

13. A method, comprising:
determining how many hops an apparatus is from a first node;
determining whether a wireless transceiver associated with the apparatus can send a signal directly to the first node;
exchanging data with neighboring nodes in a wireless network, the exchanging data comprises receiving from the neighboring nodes that can receive a signal from the first node, a hop count of the neighboring nodes from the first node;
establishing a wireless connection with the first node via at least one node belonging to a network that is interstitial to the apparatus and the first node, where downlink packets are received on a downlink path directly from the first node and uplink packets to the first node are routed to the first node through the at least one node on the uplink path interstitial with the first node responsive to determining the wireless transceiver is unable to send a signal directly with the first node and that the apparatus is the farthest away from the first node compared to the neighboring nodes that can receive a signal from the first node based on the hop count compared with the hop counts received from the neighboring nodes;

receiving a packet directly from the first node addressed to a downlink node via the wireless connection;

forwarding the packet towards the downlink node via the wireless connection; and sending a response to the packet to the first node via established wireless connection.

14. The method according to claim 13, further comprising:
storing data representative of the packet;
receiving a second copy of the packet from the second node;
discarding the second copy of the packet responsive to determining that the packet was previously received directly from the first node.

15. The method according to claim 13, further comprising:
receiving a second packet for the downlink node from the second node;
determining whether the second packet was already received from the first node; and
forwarding the second packet to the downlink node responsive to determining the second packet was not already received from the first uplink node.

16. Logic encoded in at least one non-transitory computer-readable medium for execution and when executed operable to:

determine how many hops an apparatus is from a first node;
determine whether a wireless transceiver associated with the apparatus can send a signal directly to the first node;
exchange data with neighboring nodes in a wireless network, the data exchanged comprises receiving from the neighboring nodes that can receive a signal from the first node, a hop count of the neighboring nodes from the first node;
establish a wireless connection with the first node via at least one node belonging to a network that is interstitial to the wireless transceiver and the first node, where downlink packets are received on a downlink path directly from the first node and uplink packets to the first node are routed to the first node through the at least one node on the uplink path interstitial with the first node responsive to determining the wireless transceiver is unable to communicate directly with the first node and that the wireless transceiver is farthest away from the first node based on the hop count compared with the hop counts received from the neighboring nodes;
receiving a packet directly from the first node addressed to a downlink node via the wireless connection;
forwarding the packet towards the downlink node via the wireless connection and
sending a response to the packet to the first node via the established wireless connection.

17. The logic according to claim 16, further operable to:
storing data representative of the packet;
receiving a second copy of the packet from the second node;
discarding the second copy of the packet responsive to determining that the packet was previously received directly from the first node.

\* \* \* \* \*